United States Patent
Kondo

(10) Patent No.: US 6,935,551 B2
(45) Date of Patent: Aug. 30, 2005

(54) ULTRASONIC BONDING METHOD OF COATED ELECTRIC WIRES AND ULTRASONIC BONDING APPARATUS USING SAME

(75) Inventor: Masayuki Kondo, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 22 days.

(21) Appl. No.: 10/471,773

(22) PCT Filed: Feb. 14, 2002

(86) PCT No.: PCT/JP02/01266

§ 371 (c)(1),
(2), (4) Date: Sep. 16, 2003

(65) Prior Publication Data

US 2004/0232208 A1 Nov. 25, 2004

(30) Foreign Application Priority Data

Mar. 16, 2001 (JP) ..................................... P2001-076757

(51) Int. Cl.$^7$ ............................. B23K 1/06; B23K 37/00
(52) U.S. Cl. ........................ 228/102; 228/1.1; 228/4.5; 228/8; 228/110.1; 228/180.5
(58) Field of Search ............................... 228/1.1, 110.1, 228/4.5, 180.5, 102, 103, 8; 156/73.1, 73.2, 580.1, 580.2

(56) References Cited

U.S. PATENT DOCUMENTS

| | | | |
|---|---|---|---|
| 3,734,382 A | | 5/1973 | Spanjer |
| 4,047,992 A | | 9/1977 | Williams et al. |
| 4,597,519 A | * | 7/1986 | Kurtz et al. ................. 228/102 |
| 4,821,944 A | * | 4/1989 | Tsumura ................... 228/110.1 |
| 5,110,032 A | * | 5/1992 | Akiyama et al. ........... 228/102 |
| 5,115,960 A | * | 5/1992 | Shimizu .................. 228/110.1 |
| 5,192,015 A | | 3/1993 | Ingle et al. |
| 5,433,369 A | * | 7/1995 | Okumura ................. 228/110.1 |
| 5,923,202 A | * | 7/1999 | Merrill ........................ 327/318 |
| 5,931,372 A | * | 8/1999 | Miller ...................... 228/180.5 |
| 6,019,271 A | | 2/2000 | Hayden et al. |
| 6,152,350 A | | 11/2000 | Hayashi et al. |
| 6,226,865 B1 | * | 5/2001 | Tanikawa et al. .............. 29/872 |
| 6,609,648 B2 | | 8/2003 | Kondo |
| 6,662,445 B2 | * | 12/2003 | Tanikawa et al. .............. 29/872 |
| 6,786,392 B2 | * | 9/2004 | Nogawa .................. 228/180.5 |
| 2002/0130159 A1 | * | 9/2002 | Kondo .................... 228/110.1 |
| 2004/0232208 A1 | * | 11/2004 | Kondo .................... 228/110.1 |

FOREIGN PATENT DOCUMENTS

| | | |
|---|---|---|
| DE | 196 36 217 | 3/1998 |
| EP | 0 540 189 | 5/1993 |
| JP | 406283579 A * | 10/1994 |
| JP | 9-29445 | 2/1997 |
| JP | 02002280140 A * | 9/2002 |

OTHER PUBLICATIONS

U.S. Appl. No. 10/471,773, filed Sep. 16, 2003, Kondo.

* cited by examiner

Primary Examiner—Kiley S. Stoner
(74) Attorney, Agent, or Firm—Oblon, Spivak, McClelland, Maier & Neustadt, P.C.

(57) ABSTRACT

Intersected portions (C) of coated electric wires 20 and (21) are sandwiched and pressurized between a horn-side chip (11) and an anvil-side chip (12) (sandwiching step). Ultrasonic vibration force determined by a first vibration condition is applied to the horn-side chip (11) to melt insulators (20a) and (21a) of the coated electric wires (20) and (21) (insulator-melting step). A time point when conductors (20b) and (21b) of the coated electric wires (20) and (21) come into contact with each other is automatically detected by the melting of the insulators (20a) and (21a) (conductor contact-detecting step). After the conductors came into contact with each other, ultrasonic vibration force determined by a second vibration condition is applied to the horn-side chip (11), thereby bonding the conductors (20b) and (21b) to each other (conductor-bonding step).

6 Claims, 4 Drawing Sheets

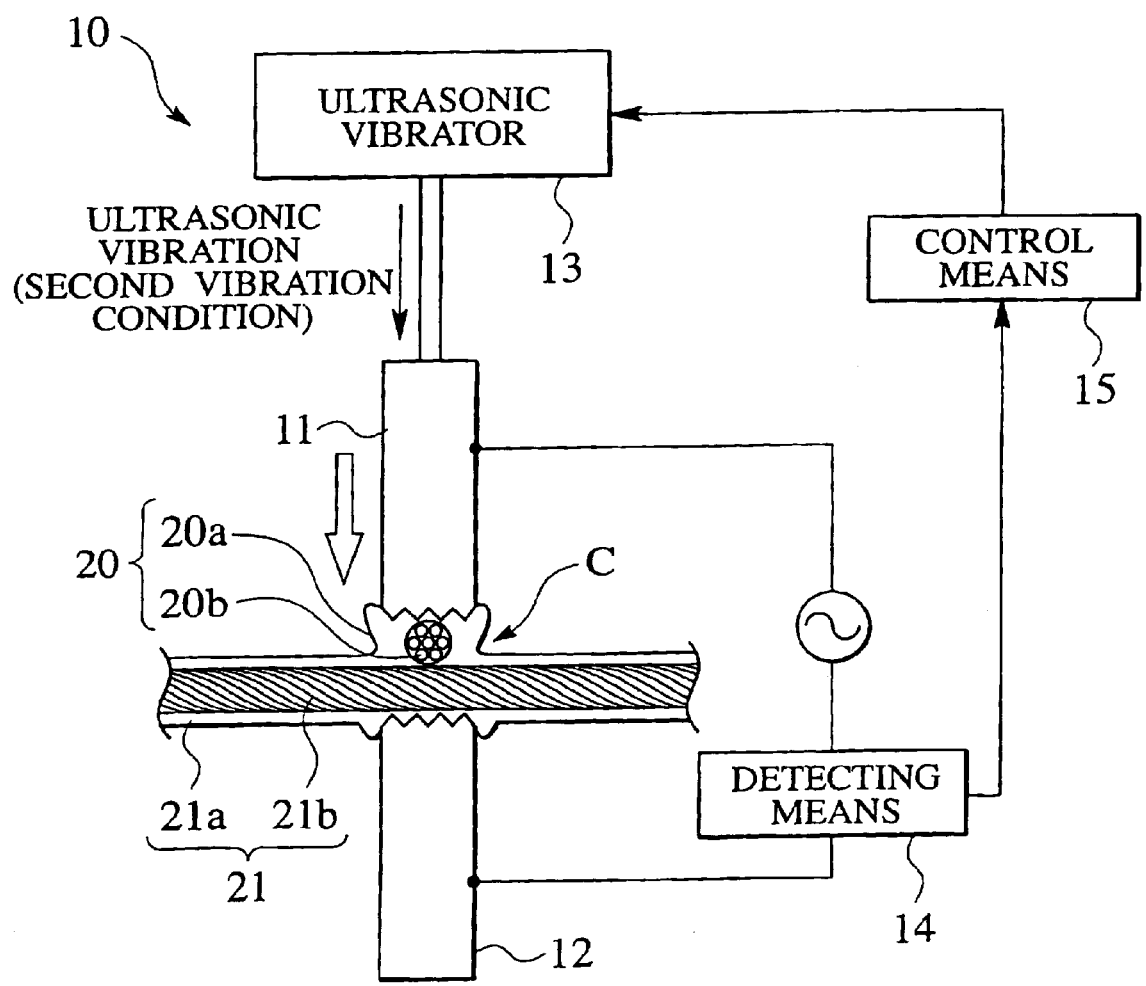

US 6,935,551 B2

ULTRASONIC BONDING METHOD OF COATED ELECTRIC WIRES AND ULTRASONIC BONDING APPARATUS USING SAME

TECHNICAL FIELD

The present invention relates to an ultrasonic bonding method of coated electric wires in which coated electric wires to be bonded are intersected with each other without removing insulator, and intersected portions of the wires are bonded to each other by ultrasonic vibration. The invention also relates to an ultrasonic bonding apparatus using the method.

BACKGROUND ART

In an ultrasonic bonding of coated electric wires, the coated electric wires are subjected to ultrasonic vibration and pressurizing force at the same time, thereby bonding the wires to each other. The ultrasonic bonding is a technique for connecting electric wires to each other as disclosed in Japanese Patent Application Laid-open No. H9-29445.

In this technique, upper and lower portions of intersected portions of the electric wires to be connected to each other are sandwiched between a horn-side chip and an anvil-side chip. In this state, ultrasonic vibration is applied to the horn-side chip, thereby bonding the electric wires to each other at the intersected portions.

In the conventional bonding operation of electric wires using the ultrasonic vibration, however, when the electric wires are coated electric wires, after insulators are melted and removed, conductors in the insulators must be bonded to each other. When the coated electric wires are to be bonded to each other, vibration condition of the ultrasonic vibration to be applied to the horn-side chip is determined by pressurizing force, frequency, amplitude and the like, but vibration condition is different when the insulators are melted and when the conductors are bonded to each other.

Therefore, the setting of conditions satisfying both the vibration conditions is complicated, and the condition setting is easily be varied depending upon positional deviation of conductors or setting deviation at the time of pressurization. Thus, the bonding operation of electric wires largely depends on guesswork or an operator, and it is difficult to obtain uniform connection state.

DISCLOSURE OF INVENTION

It is an object of the present invention to provide an ultrasonic bonding method of coated electric wires in which when intersected portions of coated electric wires are bonded to each other by ultrasonic vibration, vibration conditions of ultrasonic vibration is switched between melting operation of insulator and bonding operation of conductors, so that coated electric wires can be bonded to each other stably. It is another object of the invention to provide an ultrasonic bonding apparatus using the above method.

A first aspect of the present invention provides an ultrasonic bonding method of coated electric wires for intersecting coated electric wires with each other, and bonding intersected portions of the coated electric wires to each other by ultrasonic vibration, comprising a sandwiching step for sandwiching the intersected portions of the coated electric wires between a horn-side chip and an anvil-side chip, an insulator-melting step for applying ultrasonic vibration force determined by a first vibration condition to the horn-side chip, and melting insulators of the coated electric wires, a conductor contact-detecting step for automatically detecting a time point when the insulators are melted and conductors of the coated electric wires come into contact with each other, and a conductor-bonding step for applying ultrasonic vibration force determined by the second vibration condition to the horn-side chip after the conductors came into contact with each other, thereby bonding the conductors to each other.

In this case, by appropriately setting the first vibration condition of the ultrasonic vibration force used in the insulator-melting step and the second vibration condition of the ultrasonic vibration force used in the conductor-bonding step, it is possible melt the insulators and bond the conductors to each other in optimal states. At that time, the contact between the conductors of the coated electric wires can automatically be detected by the conductor contact-detecting step, the conditions can automatically be switched between the insulator-melting step and the conductor-bonding step, a series of connecting operation in which the insulators are melted and removed and the conductors are bonded to each other can easily and stably be carried out.

According to a second aspect of the invention, in the ultrasonic bonding method of coated electric wires of the first aspect, in the conductor-bonding step, the second vibration condition determining the ultrasonic vibration force is variable in accordance with a variation in contact area between the conductors.

In this case, during the process in which the melting proceeds from a state in which the conductors start coming into contact with each other, the contact area between the conductors is increased, and the contact proceeding degree is judged by the variation of the contact area. Therefore, the bonding state between the conductors can be optimized in accordance with the proceeding degree by varying the ultrasonic vibration forces.

According to a third aspect of the invention, in the ultrasonic bonding method of coated electric wires of the second aspect, the variation in contact area between the conductors is detected by variation in a resistance value of current flowing between the horn-side chip and the anvil-side chip.

In this case, it is possible to precisely detect the contact area between the conductors by the variation in the resistance value between the horn-side chip and the anvil-side chip. Therefore, it is possible easily and precisely estimate the bonding proceeding degree, and to appropriately vary the second vibration condition.

A fourth aspect of the invention provides an ultrasonic bonding apparatus of coated electric wires for intersecting coated electric wires with each other, and bonding intersected portions of the coated electric wires to each other by ultrasonic vibration, comprising a horn-side chip and an anvil-side chip for sandwiching and pressurizing intersected portions of the coated electric wires, an ultrasonic vibrator which outputs ultrasonic vibration force determined by a first vibration condition which melts insulators of the coated electric wires, and which outputs ultrasonic vibration force determined by a second vibration condition which bonds the conductors to each other after the conductors of the coated electric wires came into contact with each other.

In this case, in a state in which the intersected portions of the coated electric wires are sandwiched and pressurized between the horn-side chip and the anvil-side chip, if the ultrasonic vibration force is output from the ultrasonic vibrator to the horn-side chip, the intersected portions of the coated electric wires can be melted by the ultrasonic vibration. At that time, the ultrasonic vibration force for melting the insulators is determined by the first vibration condition, and the ultrasonic vibration force for bonding the conductors to each other is determined by the second vibration condition. By setting the first vibration condition and the second vibration condition such that the melting state of the insulators and the bonding state of the conductors become optimal, a series of connecting operation in which the insulators are melted and the conductors a re bonded to each other can easily and stably be carried out.

According to a fifth aspect of the invention, in the above ultrasonic bonding apparatus of coated electric wires, the apparatus further comprises detecting means for detecting a variation in contact area between the conductors, and control means for changing the second vibration condition which determines the ultrasonic vibration force in accordance with variation in the contact area detected by the detecting means.

In this case, a result detected by the detecting means is output to the control means, and the second vibration condition is varied by variation of the contact area between the conductors. Therefore, the ultrasonic vibration force can be varied between a case in which the conductors start coming into contact with each other and the contact area is small and a case in which the melting of the conductors proceeds and the contact area is increased, and it is possible optimize the bonding state between the conductors in accordance with the proceeding degree.

According to a sixth aspect of the invention, in the above ultrasonic bonding apparatus of coated electric wires, the detecting means detects a variation in a resistance value of current flowing between the horn-side chip and the anvil-side chip.

In this case, since it is possible precisely detect the contact area between the conductors by the variation of the resistance value between the horn-side chip and the anvil-side chip, it is possible easily and precisely estimate the bonding proceeding degree, and to appropriately vary the second vibration condition.

BRIEF DESCRIPTION OF DRAWINGS

FIG. 4 is a block diagram of a conductor-bonding step of the coated electric wires of the embodiment of the ultrasonic bonding apparatus of coated electric wires of the invention.

BEST MODE FOR CARRYING OUT THE INVENTION

An embodiment of the present invention will be explained in detail with reference to the accompanying drawings.

Figure 1:
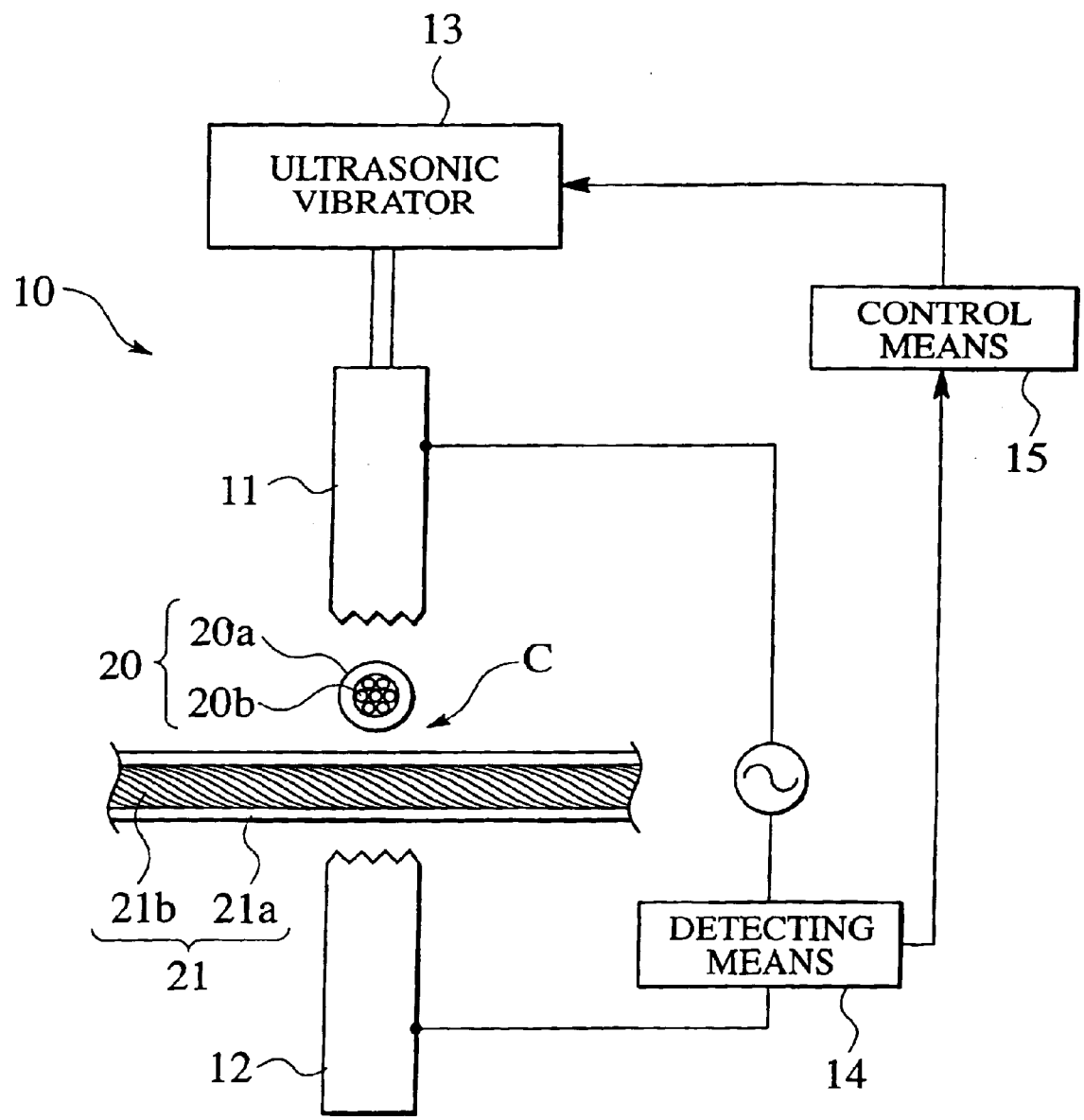
FIG. 1 is a block diagram of a set state of coated electric wire according to an embodiment of an ultrasonic bonding apparatus of coated electric wires of the present invention.

An ultrasonic bonding method of coated electric wires of the present embodiment is achieved by an ultrasonic bonding apparatus 10 shown in FIG. 1. The ultrasonic bonding apparatus 10 comprises a horn-side chip 11 and an anvil-side chip 12 which are vertically disposed such as to be opposed to each other. Coated electric wires 20 and 21 to be connected to each other are intersected with each other and disposed between the horn-side chip 11 and the anvil-side chip 12. The horn-side chip 11 is vertically movable, and the anvil-side chip 12 is fixed. If the horn-side chip 11 is lowered, the intersected portions C of the coated electric wires 20 and 21 disposed between the chips 11 and 12 are sandwiched under an appropriate pressurizing force in a pressurizing direction P.

An ultrasonic vibrator 13 is connected to the horn-side chip 11. Ultrasonic vibration generated by the ultrasonic vibrator 13 is input to the horn-side chip 11. Current is allowed to flow between the horn-side chip 11 and the anvil-side chip 12. Detecting means 14 is provided between both the chips 11 and 12 for detecting variation of electric resistance value between the chips 11 and 12. A detection signal of the detecting means 14 is output to control means 15 which changes vibration conditions of the ultrasonic vibration generated by the ultrasonic vibrator The ultrasonic vibrator 13 determines optimal ultrasonic vibration for melting insulators 20a and 21a of the coated electric wires 20 and 21 by a first vibration condition, and determines optimal ultrasonic vibration for bonding the conductors 20b and 21b of the coated electric wires 20 and 21 by a second vibration condition. If the detecting means 14 detects a time point when the conductors 20b and 21b of the coated electric wires 20 and 21 come into contact with each other, i.e., a time point when both the chips 11 and 12 are brought into conduction with each other through both the conductors 20b and 21b, the first vibration condition and the second vibration condition are switched.

Figure 2:
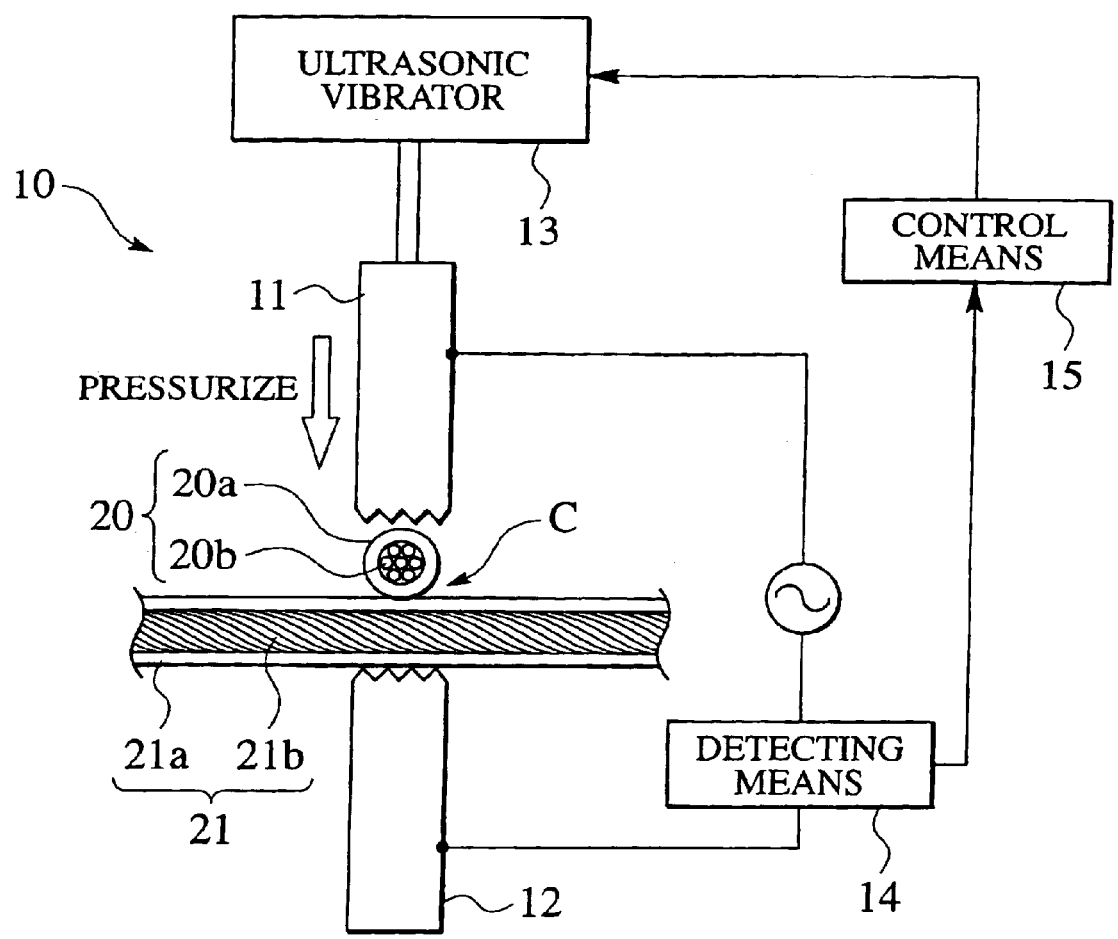
FIG. 2 is a block diagram of sandwiching step of the coated electric wire according to the embodiment of the ultrasonic bonding apparatus of coated electric wires of the invention.
Figure 3:
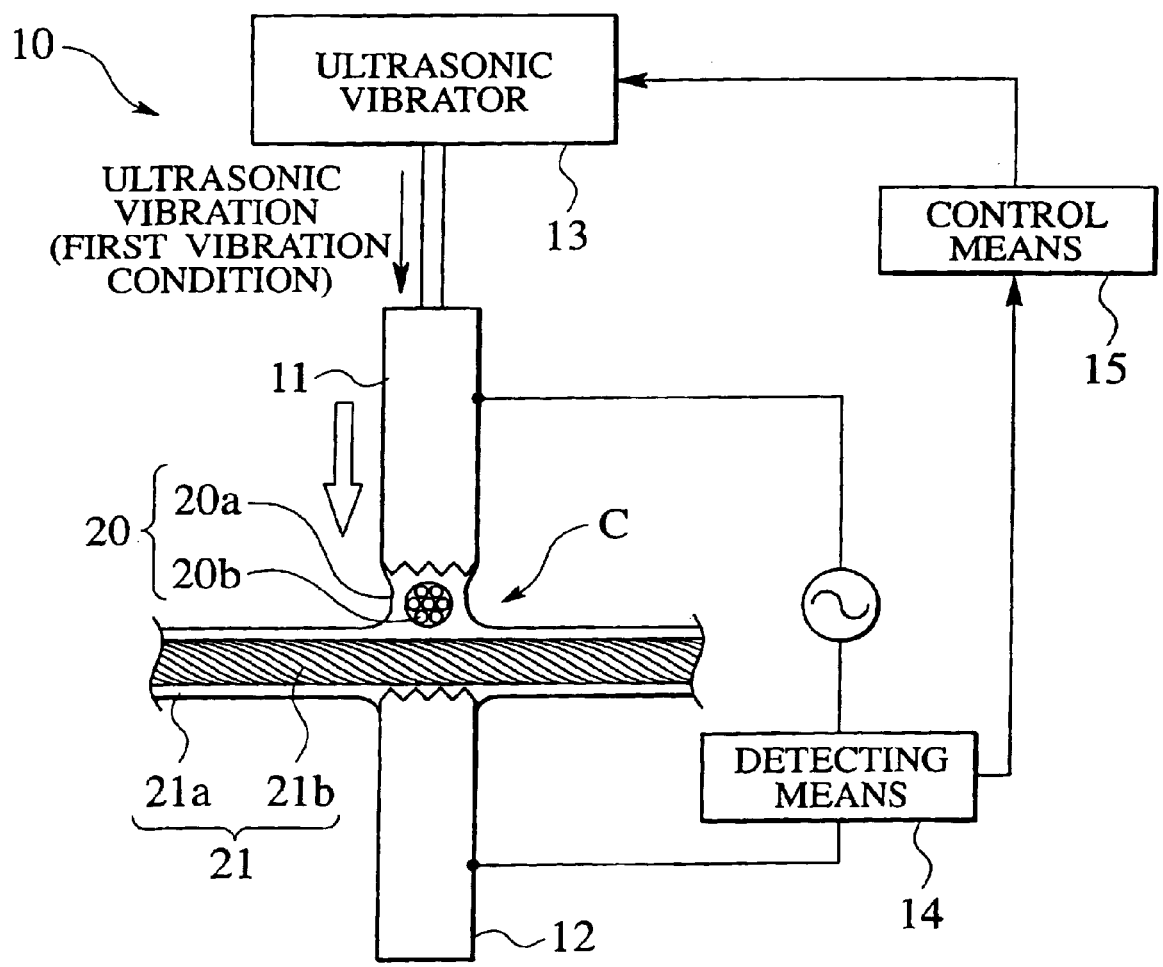
FIG. 3 is a block diagram of an insulator-melting step of the embodiment of the ultrasonic bonding apparatus of coated electric wires of the invention.

Therefore, in the ultrasonic bonding method of the coated electric wires 20 and 21 using the ultrasonic bonding apparatus 10, first, as shown in FIG. 2, the intersected portions C of the coated electric wires 20 and 21 are sandwiched between the horn-side chip 11 and the anvil-side chip 12 and pressurized (sandwiching step). Next, as shown in FIG. 3, ultrasonic vibration force determined by the first vibration condition is applied to the horn-side chip 11, thereby melting the insulators 20a and 21a of the coated electric wires 20 and 21 (insulator-melting step). Then, as shown in FIG. 4, a time point when the conductors 20b and 21b of the coated electric wires 20 and 21 come into contact with each other by melting the insulators 20a and 21a is automatically detected by the detecting means 14 (conductor contact-detecting step). Then, after the conductors 20b and 21b came into contact with each other, ultrasonic vibration force determined by the second vibration condition is applied to the horn-side chip 11, and the conductors 20b and 21b are bonded to each other (conductor-bonding step).

In the second vibration condition which determines the ultrasonic vibration force in the conductor-bonding step, a contact area between the conductors 20b and 21b is increased as the bonding operation therebetween proceeds, but the bonding operation proceeding degree is detected from variation in electric resistance value by the detecting means 14, and in accordance with the variation in resistance value, control vibration is output from the detecting means 14 to the ultrasonic vibrator 13, so that second vibration condition can be varied in accordance with the bonding operation proceeding degree.

According to the ultrasonic bonding apparatus 10 of the present embodiment having the above structure, as shown in FIG. 2, the intersected portions C of the coated electric wires 20 and 21 are sandwiched and pressurized between the horn-side chip 11 and the anvil-side chip 12 and in this state, the ultrasonic vibration force is output from the ultrasonic vibrator 13 to the horn-side chip 11, thereby connecting the coated electric wires 20 and 21 at the intersected portions C by the ultrasonic vibration. At that time, as shown in FIG. 3, when the insulators 20a and 21a of the coated electric wires 20 and 21 are melted, the ultrasonic vibration force output from the ultrasonic vibrator 13 is determined by the first vibration condition, and the insulators 20a and 21a which are entirely made of resin can be melted in an optimal state.

Next, the melting operation of the insulators 20a and 21a proceeds and the conductors 20b and 21b come into contact with each other as shown in FIG. 4, the detecting means 14 detects this state from the electric resistance value, and the second vibration condition is automatically switched to the second vibration condition so that the ultrasonic vibration force output from the ultrasonic vibrator 13 is determined by the second vibration condition, thereby bonding the conductors 20b and 21b to each other. At that time, since the second vibration condition becomes variable by a variation in the contact area between the conductors 20b and 21b, the ultrasonic vibration forces can be varied between when the contact between the conductors 20b and 21b starts and the contact area is small and when the melting operation of the conductors 20b and 21b proceeds and the contact area is large. With this feature, the bonding state between the conductors 20b and 21b can be optimized in accordance with the proceeding degree.

In this bonding, films of oxide on the bonded surfaces of the conductors 20b and 21b are destroyed by the ultrasonic energy, metal surfaces are cleaned and as a result, activated metal atoms are bonded to each other, thereby electrically bonding the conductors 20b and 21b to each other. In this case, the conductors 20b and 21b are so-called cold bonded at a temperature lower than a molten temperature.

Further, in this embodiment, when the second vibration condition is changed in accordance with change of contact area of the conductors 20b and 21b, the detecting means 14 detects the variation in resistance value of current flowing between the horn-side chip 11 and the anvil-side chip 12. Therefore, it is possible to easily and precisely estimate the change of the contact area, and to change the second vibration condition appropriately. Thus, it is possible to obtain a constant bonding state irrespective of whether each of the conductors 20b and 21b is a single wire or stranded wire, or variation of set states of both the conductors 20b and 21b.

Therefore, according to the ultrasonic bonding apparatus 10 of this embodiment, by setting the first vibration condition and second vibration condition determined by the pressurizing force, frequency, amplitude and the like such that melting states of the insulators 20a and 21a and bonding state between the conductors 20b and 21b become optimal, a series of connecting operation in which the insulators 20a and 21a are melted and removed, and the conductors 20b and 21b are bonded to each other can easily and stably be carried out irrespective of degree of skill of an operator. Therefore, it is possible enhance the stability of the connected portions, and to enhance the connecting operability.

INDUSTRIAL APPLICABILITY

The present invention provides an ultrasonic bonding method of coated electric wires in which when intersected portions of coated electric wires are bonded to each other by ultrasonic vibration, vibration conditions of ultrasonic vibration is switched between melting operation of insulator and bonding operation of conductors, so that coated electric wires can be bonded to each other stably.

What is claimed is:

1. An ultrasonic bonding method of coated electric wires for intersecting coated electric wires with each other, and bonding intersected portions of the coated electric wires to each other by ultrasonic vibration, the ultrasonic bonding method comprising:

a sandwiching step for sandwiching the intersected portions of the coated electric wires between a horn-side chip and an anvil-side chip;

an insulator-melting step for applying ultrasonic vibration force determined by a first vibration condition to the horn-side chip, and melting insulators of the coated electric wires;

a conductor contact-detecting step for automatically detecting a time point when the insulators are melted and conductors of the coated electric wires come into contact with each other; and a conductor-bonding step for applying ultrasonic vibration force determined by a second vibration condition to the horn-side chip after the conductors came into contact with each other, thereby bonding the conductors to each other.

2. An ultrasonic bonding method of coated electric wires according to claim 1, wherein in the conductor-bonding step, the second vibration condition determining the ultrasonic vibration force is variable in accordance with a variation in contact area between the conductors.

3. An ultrasonic bonding method of coated electric wires according to claim 2, wherein the variation in contact area between the conductors is detected by variation in a resistance value of current flowing between the horn-side chip and the anvil-side chip.

4. An ultrasonic bonding apparatus of coated electric wires for intersecting coated electric wires with each other, and bonding intersected portions of the coated electric wires to each other by ultrasonic vibration, the ultrasonic bonding apparatus comprising:

a horn-side chip and an anvil-side chip for sandwiching and pressurizing intersected portions of the coated electric wires;

an ultrasonic vibrator configured to melt insulators of the wires and to bond conductors of the wires to one another with an ultrasonic force; and a controller configured to vary the ultrasonic force to bond the conductors in accordance with a variation in contact area between the conductors.

5. An ultrasonic bonding apparatus of coated electric wires for intersecting coated electric wires with each other, and bonding intersected portions of the coated electric wires to each other by ultrasonic vibration, the ultrasonic bonding apparatus comprising:

a horn-side chip and an anvil-side chip for sandwiching and pressurizing intersected portions of the coated electric wires;

an ultrasonic vibrator which outputs ultrasonic vibration force determined by a first vibration condition which melts insulators of the coated electric wires, and which outputs ultrasonic vibration force determined by a second vibration condition which bonds the conductors to each other after the conductors of the coated electric wires came into contact with each other;

detecting means for detecting a variation in contact area between the conductors, and control means for changing the second vibration condition which determines the ultrasonic vibration force in accordance with variation in the contact area detected by the detecting means.

6. An ultrasonic bonding apparatus of coated electric wires according to claim 5, wherein the detecting means detects a variation in a resistance value of current flowing between the horn-side chip and the anvil-side chip.

* * * * *